March 26, 1968 A. L. GIRARD 3,374,515

METHOD OF MAKING AN ELECTRICAL CAPACITOR

Filed June 3, 1966

United States Patent Office 3,374,515
Patented Mar. 26, 1968

---

3,374,515
METHOD OF MAKING AN ELECTRICAL CAPACITOR
Arthur L. Girard, North Adams, Mass., assignor to Sprague Electric Company, North Adams, Mass., a corporation of Massachusetts
Filed June 3, 1966, Ser. No. 555,188
1 Claim. (Cl. 29—25.42)

ABSTRACT OF THE DISCLOSURE

A capacitor of non-speared metallized thin-film dielectrics is produced by metallizing a base, then forming a film on the metal, then heating to cure the film and produce an adhesion between the film and the metal that is greater than the adhesion between the metal and the base, and then stripping the metal and film from the base.

---

The present invention relates to a metallized thin film capacitor and a method of producing same. More particularly, the invention relates to a strip film capacitor and its method of production.

It is known to deposit a thin metal coating on polymer film or paper by deposition from the vapor phase in a high vacuum, such coating being termed "vacuum deposited." Unfortunately, many materials are not satisfactory for use in such processes, either because they undergo changes as a result of the high temperature and/or vacuum to which they must be exposed or because the preferred composition being more readily, economically or solely available in pre-polymer or solution form, the application of the vacuum deposition method is rendered impracticable.

It is further known, that capacitors whose polymeric dielectrics are metallized by vacuum deposition are permeated with what are commonly called spears which consist of penetrations of the applied metal into depressions and pores of the dielectric film. The voltage capability of the capacitor being dependent upon the dielectric strength of the thinnest portion of the dielectric film, the presence of spears reduces its effective electrode separation at points of spearing, thus lowering the voltage capability as well as the capacitance of the capacitor. Attempts to solve this problem have consisted primarily in the application of multiple layers of the dielectric material upon one or both faces of the metal electrode. Such mutliple applications, in addition to being time and material consuming, fail to solve the problem of non-uniformity of effective electrode separation between areas where spearing has and has not occurred.

The strip film method has been the most widely used multiple application process. It consists of forming a lacquer layer upon a substrate, usually a waxed paper, vacuum metallizing this initial lacquer layer, and then forming a second layer over the deposited metal electrode. Subsequently the two lacquer layers and their sandwiched metal electrode are stripped from the substrate, and two or more of these combinations are rolled into a capacitor unit in a rolling operation performed immediately after and upon the same apparatus as the stripping. In this manner, the spears occurring in the initial lacquer layer due to its vacuum metallization are, in the wound capacitor, shielded by the thickness of the second spearless lacquer layer. The result is that the effective electrode separation, the actual minimum thickness of dielectric between any two electrode layers, which determines voltage strength and capacitance, is equal only to the thickness of the second or shielding layer. The initial lacquer layer while adding to the bulk and cost of the capacitor has its effectivenes reduced to a minimum by the spears. The shielding layer then fails to eliminate, although it does to some degree alleviate, the spearing problem.

Difficulty has also been encountered in providing dielectric materials possessing the physical properties necessary for high capacitor efficiency, particularly when accompanied by demands for small unit size and high thermal capability.

It is therefore an object of the present invention to produce a convolutely wound electrical capacitor having a self-supporting metallized thin-film dielectric which is substantially free of spears and consequently provides a minimum effective electrode separation substantially equal to the dielectric thickness at any point in the capacitor.

It is a further object of this invention to produce a convolutely wound thin-film capacitor of high temperature capability and substantially free of spears from materials not readily available in thin-film form.

It is still a further object of this invention to teach a method for producing a spearless convolutely wound metallized thin film capacitor.

These and other objects of this invention will become more apparent upon consideration of the following description of its exemplifications together with reference to the accompanying drawing, in which.

The present invention provides a convolutely wound metallized film capacitor having a spearless construction and hence improved voltage capability and capacitance characteristics.

According to the present invention, there is also provided a convolutely wound electrical capacitor having self-supporting non-speared metallized thin-film dielectrics produced by a method comprised of the steps of forming a film upon the face of a metallized base and then heating to cure the polymer film and produce an adhesion between the film and metal layer greater than the adhesion between the metal and base, thus providing thin film formation and metallizing in a single operation.

More particularly, the present invention provides for a convolutely wound electrical capacitor having a self-supporting metallized thin-film dielectric produced by a method comprising the steps of, forming, by casting or extrusion, a film of a preferred dielectric material upon the face of a metal layer adhering to a substrate, heating so as to cure the film and simultaneously produce an adhesion between the film and metal layer superior to that between the substrate and said metal layer, and finally stripping the film and its adhering metal layer, which combination is hereinafter designated the product, from the substrate.

Upon completion of the product, a capacitor may be formed by any of the methods familiar to those skilled in the wound capacitor art.

The capacitor described above, when manufactured using a film-forming varnish of high thermal capability produces a unit with a combination of highly desirable small size, high thermal capability, and uniformity of electrical characteristics due to the absence of spears, said characteristic of being free of spears being designated spearless or non-speared.

Figure 1:
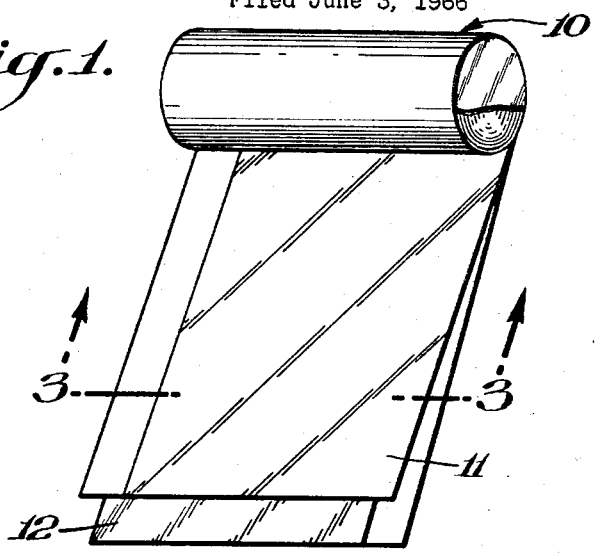
FIGURE 1 is a perspective view of a partially unrolled capacitance section showing the electrode metal layers supported upon the self-supporting thin-film dielectric according to this invention.

Referring to the drawing, FIGURE 1 shows a capacitance section 10 in partially unrolled perspective to illustrate the successive convolute windings of metallized dielectrics 11 and 12 which make up section 10.

Figure 2:
FIGURE 2 is a greatly enlarged sectional view of the conventional metallized thin film of the prior art.

FIGURE 2 shows a detailed section of the vacuum metallized thin film 13 of the prior art. As is shown, dielectric film 14 has spears 15 of the vacuum deposited metal 16 penetrating into its pores. Said penetrations may extend through the entire thickness of the initial lacquer film 14 or through only a fraction thereof as shown. Hence, at the points where such spearing occurs, the dielectric film 14 possesses varying degrees of voltage strength proportional to the respective reduction in dielectric thickness and electrode separation.

Recent attempts to diminish or eliminate the effects of spears have consisted of applying a second lacquer coat 17 to either the metal face 16 or, as shown here, to the initial lacquer layer 14. By applying an initial layer 14 of ½ the dielectric thickness desired in the capacitor, metallizing and then applying the second layer of lacquer 17, the spears 15 in the initial film 14 were shielded by the supplementary application. Although this did shield the spears with a film of a minimum effective thickness equal to ½ the total thickness of the dielectric, it did not eliminate the problem of spearing, since where spearing occurred, the maximum effective electrode separation which determines maximum voltage strength and ultimately unit capacitance remained only ½ that of the total dielectric thickness.

Figure 3:
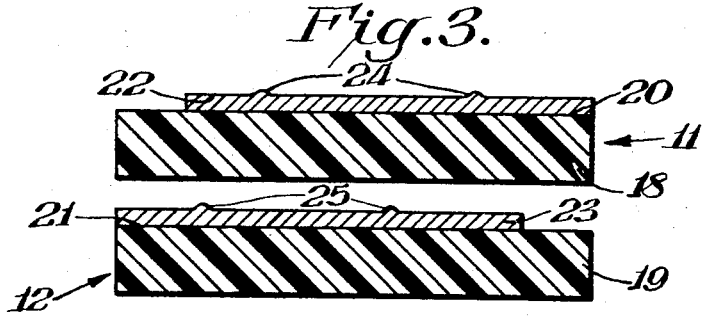
FIGURE 3 is a greatly enlarged sectional view of the successive layers taken along line 3—3 of FIGURE 1 showing the composite makeup of the layers in the capacitor of this invention.

As is shown in FIGURE 3, the present invention provides a capacitor having self-supporting metallized dielectric films 11 and 12 whose minimum effective electrode separation is substantially equal to the actual thickness of the dielectric films 18 and 19 of the capacitor unit at any point. This characteristic exists due to the novel construction here employed. The interfaces 20 and 21 between the dielectric films 18 and 19 and their intimately adhered metal films 22 and 23 are substantially even and without pore penetration of the metal. The spears 24 and 25 which may occur upon the nonadhering surfaces of 22 and 23, depending upon the substrate used, are sheared off or greatly reduced in size during the stripping operation. Since the penetrations are very fine and brittle, the majority of them will be retained by the substrate upon stripping, and those which are not so removed are reduced in size and easily covered or shielded by the overlying layer of the pliable dielectric film, without penetration of the dielectric film or diminution of the effective electrode separation, where such covering occurs in the wound capacitor.

The result being that the present invention teaches a method for the elimination of the spearing problem in metallized thin-film capacitors. According to this invention, capacitors having self-supporting metallized films of lesser thickness than those presently in use may be attained, since single film application provides effective electrode separation equal to thickness, whereas the prior art provided effective electrode separation equal only to the thickness of a second shielding layer 17 of FIGURE 2, or that thickness of the dielectric film above or below the maximum penetration of the metal spears.

This will be of advantage in areas where miniaturization, maximum voltage strength, and maximum capacitance are demanded of a capacitor unit. Concurrently it will provide for a cost reduction, since a single lacquer application may now achieve what was formerly possible only through the use of multiple applications.

The substrate or base film or sheet which may consist of any suitable material may be metallized using any of the standard methods, the usual process being vacuum deposition.

The metallized substrate is then coated by casting, extrusion or other means with a film of the desired lacquer such that upon curing of said film it will yield a self-supporting film of predetermined thickness and electrical properties. Said film being formed, the combination of substrate, metal and film is then subjected to conditions of heat and/or vacuum, which while causing either a partial or complete cure of the film also bring about an adhesion between the film and the electrode metal superior to that between the electrode metal and the substrate. The latter change occurs because the varnish film is cured after it has molded itself to the contours of the metal layer and before the vacuum deposited metal has had time to harden completely or attain its optimum degree of adhesion to the substrate. This hardening and adhering process requires approximately 48 hours in the case of zinc or aluminum. Thus, the coating, curing and stripping operations should be performed only upon freshly metallized substrates, in the case of zinc and aluminum within 48 hours, and in all cases as soon as practicable after metallizing. This superior adhesion then permits the film and its adhering metal layer to be separated from the substrate as an integral unit.

Under these conditions, the metallizing will be transferred completely without fault or puncture and with the advantageous removal of the majority of the spears formed by penetration of the metal into the substrate during metallization when a porous substrate material is used. Thus, there is provided not only a non-speared dielectric film, but also a substantially de-speared electrode surface where a porous substrate permits formation. If a non-porous substrate is used, no spearing will occur during metallization and hence neither face of the electrode will be speared.

It should again be noted that the sooner the coating with the dielectric film is performed after the metallizing of the substrate, the more easily will the product strip from the substrate. In the case of zinc and aluminum the lapse time should not exceed 48 hours.

A suggested, but not exclusive, method of rolling is to have the stripping and rolling operations performed simultaneously as is presently done in the case of several strip film processes. In this manner, extremely thin metallized films can be formed and supported upon the stronger substrate material, until such time as rolling is performed.

It is clear that a broad range of materials may be substituted as substrate, applied electrode metal and self-supporting thin-film dielectric. Various grades and forms of paper such as kraft paper and silicon treated release papers or polymer films as polyethyleneterephthalate are suitable as substrate.

Any conductive metal capable of deposition upon a suitable substrate, especially zinc, copper, aluminum and silver may form the transferred electrode metal.

As thin-film dielectric, polyamide, polyimide, polyamide-polyimide hybrids, polycarbonate and cellulose acetate compositions among others having good film forming and electrical characteristics are useful and practicable.

When the above specified materials are used in conjunction with this novel manufacturing method there is provided a wound thin-film capacitor which not only has electrode separation equal to dielectric thickness at any specific point, with the consequent higher breakdown voltage and increased capacitance, and relatively small size due to the single thickness construction, but also one with electrical properties substantially better than those of polyethyleneterephthalate or other presently used dielectrics at room temperature, and capable of maintaining these superior properties to 150° C. The exceptionally low dissipation factor, high insulation resistance, and high dielectric strength possessed by films of certain of these substances at room and elevated temperatures make their application to this method doubly desirable since for the most part they are unavailable in films of thicknesses less than 1 mil, and hence are not subject to metallizing by any conventional means until after a film forming operation.

Several embodiments of this invention are set forth in the following examples which are presented for the purpose of illustration only and are not intended to be limitative.

*Example I*

Samples of 0.5 and 0.75 mil Mylar which were freshly vacuum zinc metallized were coated, by casting onto the metallized face a 0.5 mil thickness of a prepolymer solution or varnish of pyromellitic acid and PP'-diamine diphenylether in a 3 component solvent system of N-methylpyrolidone, dimethylacetamide and toluol in a 6/3/4 ratio. This film was then partially cured to a tack and solvent free state of the corresponding polyamide condensation polymer by heating at 72° C. for a period of 20 minutes, and then stripped from the Mylar substrate by rolling upon a steel mandrel once the stripping was begun by manual separation. The stripping yielded a film of the polyamide resin which was zinc metallized upon one face. Observation indicated that the transfer of the metallizing had been complete and without fault or puncture. The rolled metallized film was then further cured to the final polyimide condensation product by heating at 200° C. for a 2 hour period providing a self-supporting metallized film of high temperature capability suitable for capacitor winding.

In the present and all subsequent examples, the electrode metal was initially deposited upon the Mylar substrate metallized at the desired electrode width with the necessary margin provided by protective masking during metallizing. In this manner the polymer film cast over the metallized substrate is, in the forming operation, also margined and prepared at the proper electrode width. Hence, after the normal slitting operation, which may occur prior or subsequent to the stripping, the final rolling of the capacitor is routine.

*Example II*

Samples of 0.5 and 0.75 mil Mylar which were freshly zinc metallized were coated on the metallized face with a 2 mil thickness of a 10% solution of a (General Electric) polycarbonate resin, known to the art under the trademark of Lexan, in chloroform. The film was then cured by heating at 72° C. for 5 minutes. The stripping of the cured polycarbonate film from the Mylar substrate in the above described manner yielded a thin (0.20 mil) polycarbonate film, metallized upon the contacting surface. These films were then formed into the convolutely wound electrical capacitor using standard rolling techniques.

Subsequent examples made use of aluminum as the transferred electrode metal with similar desirable results being obtained.

In the examples where polyamide, polyimide or polyamide-polyimide hybrid resins are used as dielectric film, films which are only partially cured to a tack and solvent free state then stripped and rolled according to standard methods, may then, in the finished capacitor, be subjected to a final cure for the recommended 2 hour period at 200° C. This further condensation of the polymer yields a shrinkage of approximately 10% which causes the film to tighten in its convolutely wound configuration, thus providing a more tightly wound and consequently more compact unit possessing the same desirable electrical characteristics as the unit formed of resin finally cured prior to rolling.

It will be readily understood that the description herein is for the purpose of illustration and that the scope of the invention is limited only by the appended claims.

What is claimed is:
1. A method of producing a convolutely wound metallized thin film electrical capacitor substantially free of spears comprising the steps of:
   (a) metallizing a substrate material by vacuum deposition of a conductive metal;
   (b) forming a dielectric varnish film upon the face of the conductive metal layer adhering to the substrate;
   (c) heating said combination so as to produce a partial curing of the varnish film and an adhesion between the film and the metal layer superior to that already existing between the metal layer and the substrate;
   (d) stripping the self-supporting dielectric film and its adherent conductive metal layer from the substrate;
   (e) taking a second self-supporting dielectric film and its adherent conductive metal layer made by the method of steps (a) through (d) and placing the dielectric film of the second combination over the metal layer of the first combination;
   (f) rolling the first and second combinations into a convolutely wound electrical capacitor; and
   (g) heating the wound capacitor to produce a final curing of the dielectric material.

References Cited

UNITED STATES PATENTS

| | | |
|---|---|---|
| 1,370,666 | 3/1921 | Novotny. |
| 2,797,373 | 6/1957 | Peck. |

FOREIGN PATENTS

| | | |
|---|---|---|
| 736,479 | 9/1955 | Great Britain. |

LARAMIE E. ASKIN, *Primary Examiner.*

LEWIS H. MYERS, *Examiner.*

E. GOLDBERG, *Assistant Examiner.*